L. G. COPEMAN.
GREASE CUP.
APPLICATION FILED FEB. 17, 1919.
1,368,546.
Patented Feb. 15, 1921.
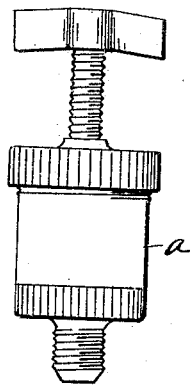
Fig.1.
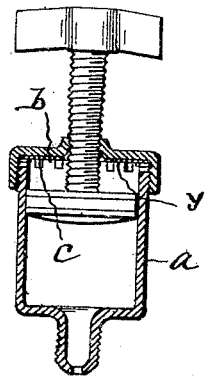
Fig.2.
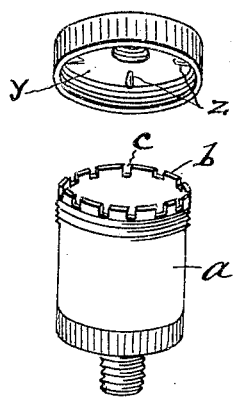
Fig.3.
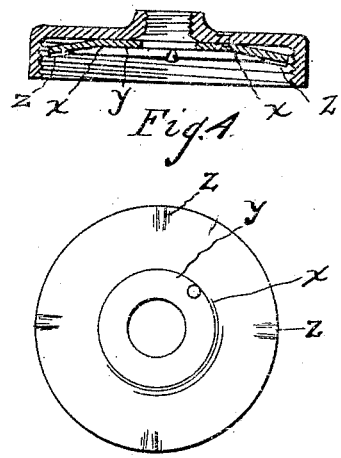
Fig.4.
Fig.5.
INVENTOR
Lloyd G. Copeman
BY Stuart C. Barnes
ATTORNEY.

UNITED STATES PATENT OFFICE.

LLOYD GROFF COPEMAN, OF FLINT, MICHIGAN, ASSIGNOR TO COPEMAN DEVELOPMENT COMPANY, OF FLINT, MICHIGAN, A CORPORATION OF MICHIGAN.

GREASE-CUP.

1,368,546.

Specification of Letters Patent.  Patented Feb. 15, 1921.

Application filed February 17, 1919. Serial No. 277,428.

*To all whom it may concern:*

Be it known that I, LLOYD G. COPEMAN, a citizen of the United States, residing at Flint, county of Genesee, State of Michigan, have invented a new and useful Improvement in Grease-Cups, of which the following is a specification.

This invention relates to grease cups, and has for its object a grease cup which is provided with an arrangement for locking the screw cap on so that it will not jar off, as happens to a great many grease cup caps. I am aware that it is not broadly new to lock two parts of a grease cup that screw together so that vibration will not cause them to separate. This, however, is a marked improvement over structures heretofore designed to accomplish this end. Cups so designed heretofore have been of such a character as not to positively lock the screwed-in part from jarring loose. Furthermore, the design thought necessary to be adopted to accomplish this end has been open to the very serious objection that the screw-threads were on the working side of the plunger so that if the threads were not absolutely tight the plunger has to exude the grease around the threads. This will be described more in detail after the construction is understood.

In the drawings,—

Figure 1 is a side elevation of the cup.

Fig. 2 is a longitudinal section thereof.

Fig. 3 is a perspective showing how the cap and barrel go together.

Fig. 4 is a section through the cap.

Fig. 5 is a plan view of the spring washer.

The barrel is designated $a$ and is similar to the barrel of the conventional plunger type grease cup except that at the top an unthreaded ring portion $b$ is left. This is notched with a plurality of notches $c$. In the inside of the cup is located a special spring steel concavo-convex disk. This is illustrated by comparing Figs. 4 and 5. At the center is a flat ring portion $y$ adapted to abut against the inside of the cap. $x$ is the line on which the metal angles away from the flat portion of the concavo-convex disk. Short corrugations or projections $z$ are stamped out along the margin. These form locking projections adapted to engage in the notches $c$ in the rim of the barrel.

It will be seen by examining Fig. 4 that this concavo-convex spring disk is of slightly less diameter than the inside of the cap. Consequently the angling or spring annulus of the washer can be flattened out to correspond with the flat ring portion $y$, this distortion giving the spring action which not only tends to bind the threads of the cap upon the threads of the barrel but tends to prevent rotation of the cap relative to the barrel due to the four projections $z$ engaging in the notches $c$ of the barrel.

As stated in the introductory matter, it is not broadly new to lock the two parts of a grease cup that screw together from separation, but so far as I am aware it has been found necessary to redesign the plunger type of grease cup to effect this object. Instead of using the ordinary barrel with the shallow cap that screws over the top of the barrel a base about half the depth of the ordinary barrel is used. Into the interior threads of this base a cap is screwed which in truth acts as the barrel and contains the grease. In the interior of the base a spring ring is provided but not a concavo-convex disk with a spring annulus. The grease-containing cap having been screwed to the base, the spring ring is supposed to function by a projection therein engaging in notches in the inner end of the cap. A grease cup of this character is open to the objection that the threads are on the working side of the plunger, that is to say, the threaded joint must resist the tendency of the screw plunger to exude grease therethrough. It is a well recognized fact that the chief superiority of the plunger type grease cup over the very much cheaper type of cup that simply threads on a base, is that it is much more reliable in insuring the grease being delivered to the bearing instead of being extruded through the threads.

A very serious objection to the type of grease cup with which comparison is made is that the spring ring is subjected to the great pressure caused by the plunger. Hence very often the ring itself is compressed by the pressure caused by the plunger, thereby absolutely putting it out of function as a binding agent to lock the grease-containing cap to the base. This actually happens when the plunger is screwed down to the bottom of the cup for then the end of the plunger strikes the ring, compresses it and forces the projection out of the notches. This either must occur or else the range of the plunger must be limited so that it will not function to expel all of the grease out of the cup, which is very undesirable. Obviously with the plunger screwed to the bottom of the cup, the grease-containing cap is free to turn off in the same way that a cap of any grease cup is. This cannot happen with my construction as obviously the plunger only contacts the spring washer when the plunger has not been turned down at all and no one ever thinks of putting a grease cup on a car without turning the plunger some distance in to feed the bearing some grease.

Furthermore, with very hard greases, it is not necessary for the plunger to contact the spring washer to sometimes put it out of commission. With a perfect fluid, that is a hypothetical fluid that yields immediately without resistance, the pressure on the spring washer would be equal on all sides. Hence the pressure of the grease upon the washer would not tend to force the projection out of the notches, but obviously as the fluid becomes more viscous and with some of the hard greases, there is a considerable resistance to distortion. Hence with grease of requisite hardness or grease that had become caked, very often the resistance of such caked grease to an effort to make it flow due to contact with the ring having a considerable area, is greater than the strength of the spring. Such being the case, then the spring detent will be forced out of the notches by the pressure of the plunger on the hard grease and the spring washer will cease to function in the way that it was designed. Of course, this objectionable operation depends altogether upon the hardness of the grease and the relative area and strength of the spring. Nevertheless it is a very objectionable condition that inheres in this type of construction.

In the construction that I have described this objection is never met with as the spring washer is never subjected to the pressure of the grease caused by the plunger. The spring washer is behind the plunger and never comes in contact with the grease.

The notches in the top of the barrel perform a very useful function in screwing the grease cups into place, especially when they are placed on the car by the manufacturer. A spider-like wrench can be used with arms that drop into the notches. This avoids the necessity of having a hexagon or a milled base for applying a wrench or pliers to the barrel, which would spoil the finish.

What I claim is:

1. A grease cup, having in combination, a cup provided at one end with an externally threaded nipple portion and at the other end with notches cut clear through the barrel wall and having substantially rectangular portions to effect a wrench hold, a cap adapted to fit over the notched end of the barrel, and a plunger functioning in the barrel to extrude the grease.

2. A grease cup, comprising a barrel provided at one end with an externally threaded nipple portion and at the other end with notches cut clear through the barrel wall and having substantially rectangular portions to effect a wrench hold, a cap fitting over the notched end of the barrel, detents supported by the cap and adapted to engage in said notches, spring means for maintaining said detents in said notches, and a plunger functioning in the barrel for extruding the grease.

3. A grease cup, having in combination, a barrel provided at one end with an externally threaded nipple portion and at the other end with castellations of such a character as to allow a spanner wrench to be placed thereon to turn the barrel, a cap adapted to fit over the castellated end of the barrel, and a spring washer provided with detents adapted to engage in the castellations when the washer is mounted between the cap and the barrel, the said cap and barrel being provided with threads to allow the cap to be screwed on to the barrel end while the spring washer and detents engage in the castellations to serve to keep the cap from accidentally working off.

4. A grease cup, having in combination, a barrel provided at one end with notches or castellations cut clear through the barrel wall from outside to inside and of such a character as to take a spanner wrench, the end of the barrel being provided with a threaded nipple which can be screwed into the bearing by the spanner wrench applied to the castellated end, a cap adapted to be fitted on the notched end of the barrel and engage thereon, a spring washer engaging between the cap and barrel end, and detents engaging in the notches or castellations when the cap and spring washer are fitted on to the end of the barrel for the purpose of preventing the cap from working loose from the barrel.

In witness whereof I have hereunto set my hand on the 5th day of February, 1919.

LLOYD GROFF COPEMAN.